US011809747B2

(12) United States Patent
Zilberstein et al.

(10) Patent No.: US 11,809,747 B2
(45) Date of Patent: Nov. 7, 2023

(54) STORAGE SYSTEM AND METHOD FOR OPTIMIZING WRITE-AMPLIFICATION FACTOR, ENDURANCE, AND LATENCY DURING A DEFRAGMENTATION OPERATION

(71) Applicant: Western Digital Technologies, Inc., San Jose, CA (US)

(72) Inventors: Einav Zilberstein, Had Hasharon (IL); Hadas Oshinsky, Kfar Saba (IL); Oren Ben Hayun, Petah Tikva (IL); Rotem Sela, Haifa (IL); Alex Lemberg, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/558,089

(22) Filed: Dec. 21, 2021

(65) Prior Publication Data
US 2023/0195376 A1 Jun. 22, 2023

(51) Int. Cl.
*G06F 3/06* (2006.01)

(52) U.S. Cl.
CPC ............ *G06F 3/0659* (2013.01); *G06F 3/064* (2013.01); *G06F 3/0619* (2013.01); *G06F 3/0673* (2013.01)

(58) Field of Classification Search
None
See application file for complete search history.

(56) References Cited

U.S. PATENT DOCUMENTS

| 7,409,522 | B1 | 8/2008 | Fair et al. |
| 7,721,059 | B2 | 5/2010 | Mylly et al. |
| 8,051,265 | B2 | 11/2011 | Lee et al. |
| 8,190,811 | B2 | 5/2012 | Moon et al. |
| 8,626,987 | B2 | 1/2014 | Jung et al. |
| 8,819,375 | B1 | 8/2014 | Pruett et al. |
| 8,990,477 | B2 | 3/2015 | Parker et al. |
| 9,355,027 | B2 | 5/2016 | Park et al. |
| 9,542,307 | B2 | 1/2017 | Karp |
| 9,645,742 | B2 | 5/2017 | Duzly et al. |

(Continued)

FOREIGN PATENT DOCUMENTS

| JP | 2002268924 A | 9/2002 |
| JP | 2003186709 A | 7/2003 |

(Continued)

OTHER PUBLICATIONS

"What is Flash-Friendly File System (F2FS)?"; The Linux Kernel Archives; downloaded from the Internet at https://www.kernel.org/doc/Documentation/filesystems/f2fs.txt on Dec. 21, 2021; 12 pages.

(Continued)

*Primary Examiner* — Sanjiv Shah
*Assistant Examiner* — Alexander J Yoon
(74) *Attorney, Agent, or Firm* — Crowell & Moring LLP

(57) ABSTRACT

A storage system analyzes a logical block address range of data in a resolution of a defragmentation unit. The storage system determines whether a given defragmentation unit is fragmented above a threshold and performs a defragmentation operation accordingly. Additionally or alternatively, the storage system can receive a suggested logical block address read order from a host to improve performance.

14 Claims, 9 Drawing Sheets

(56) References Cited

U.S. PATENT DOCUMENTS

| | | | |
|---|---|---|---|
| 10,140,067 B1 | 11/2018 | Horn et al. | |
| 10,402,114 B2* | 9/2019 | Ogawa | G06F 3/061 |
| 10,559,619 B2* | 2/2020 | Nakamizo | H04N 25/60 |
| 10,572,379 B2 | 2/2020 | Guo et al. | |
| 10,599,619 B2* | 3/2020 | Stouder-Studenmund | G06F 12/1009 |
| 2008/0077762 A1 | 3/2008 | Scott | |
| 2011/0055430 A1* | 3/2011 | Chen | G06F 3/0679 710/5 |
| 2013/0173842 A1 | 7/2013 | Ng et al. | |
| 2013/0226881 A1* | 8/2013 | Sharma | G06F 16/1748 707/E17.005 |
| 2014/0189264 A1* | 7/2014 | George | G06F 3/0611 711/154 |
| 2014/0189266 A1* | 7/2014 | Sharma | G06F 13/00 711/155 |
| 2014/0229657 A1 | 8/2014 | Karamov et al. | |
| 2016/0062664 A1* | 3/2016 | Samuels | G06F 3/0679 711/103 |
| 2016/0283160 A1 | 9/2016 | Trika | |
| 2017/0083261 A1 | 3/2017 | Seo et al. | |
| 2020/0401557 A1 | 12/2020 | Struyve et al. | |

FOREIGN PATENT DOCUMENTS

| | | |
|---|---|---|
| JP | 2005208697 A | 8/2005 |
| JP | 2010020641 A | 1/2010 |
| JP | 2010522400 A | 7/2010 |
| JP | 2015513741 A | 5/2015 |
| JP | 2016515231 A | 5/2016 |
| JP | 2018060321 A | 4/2018 |

OTHER PUBLICATIONS

U.S. Appl. No. 17/215,898, filed Mar. 29, 2021.
Non-final Office Action dated Aug. 2, 2023 for U.S. Appl. No. 17/558,014, 11 pages.

* cited by examiner

| Scenario | Original 1GB File | Case #1 | Case #2 |
|---|---|---|---|
| | Sequential Write 1GB<br>Sequential Read 1GB | Sequential Write 1GB<br>Random Write 1GB Range<br>Sequential Read | Sequential Write 1GB<br>Random Write 100MB Range<br>Sequential Read |
| Die Pages # | 32,768 | 32,768 | 32,768 |
| NAND Senses in SR | 32,768 | 47,662 | 47,662 |
| Fragmented Chunks [Die Page Size] | 0 (1 Sense Per Chunk) | 14,792 (2 Senses Per Chunk) | 2,113 (8 Senses Per Chunk) |

FIG. 5

STORAGE SYSTEM AND METHOD FOR OPTIMIZING WRITE-AMPLIFICATION FACTOR, ENDURANCE, AND LATENCY DURING A DEFRAGMENTATION OPERATION

BACKGROUND

Fragmentation of a memory of a storage system can reduce performance of the storage system. Such fragmentation can occur when a host writes an update to a file previously stored in the memory. Over time, the level of fragmentation can increase, resulting in an increased degradation of performance. In order to increase the performance of the storage system, electronic devices, such as personal computers, can perform a file system defragmentation operation if logical addresses of files are fragmented

BRIEF DESCRIPTION OF THE DRAWINGS

FIG. 5 is a chart illustrating two cases of fragmented files of an embodiment.

DETAILED DESCRIPTION

The following embodiments generally relate to a storage system and method for optimizing write-amplification factor, endurance, and latency during a defragmentation operation. In one embodiment, a storage system is presented comprising a memory and a controller. The controller is configured to analyze a logical block address range of data stored in the memory, wherein the logical block address range is analyzed in a resolution of a defragmentation unit; and for each defragmentation unit: determine if the defragmentation unit is fragmented above a threshold; and in response to determining that the defragmentation unit is fragmented above the threshold, perform a defragmentation operation on the defragmentation unit.

In another embodiment, a method is provided comprising receiving, from a host, data for storage in the memory, wherein the data is received in a sequential logical block address order; receiving, from the host, a specified order in which the host intends to read the logical block addresses in a future read operation, wherein the order is different from the sequential logical block address order; and storing the data in the memory in the specified order, wherein at least some sequential logical block addresses are stored in non-sequential physical addresses in the memory.

In yet another embodiment, a storage system is provided comprising a memory; means for analyzing a logical block address range of data stored in the memory, wherein the logical block address range is analyzed in a resolution of a defragmentation unit; means for determine if a defragmentation unit is fragmented above a threshold; and means for performing a defragmentation operation on the defragmentation unit in response to determining that the defragmentation unit is fragmented above the threshold. Other embodiments are provided and can be used alone or in combination.

Figure 1A:
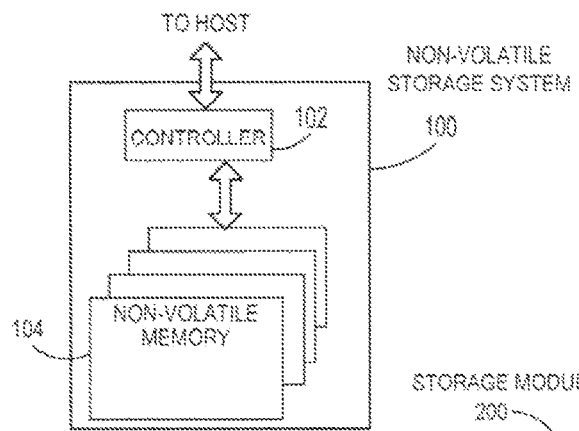
FIG. 1A is a block diagram of a non-volatile storage system of an embodiment.
Figure 1B:
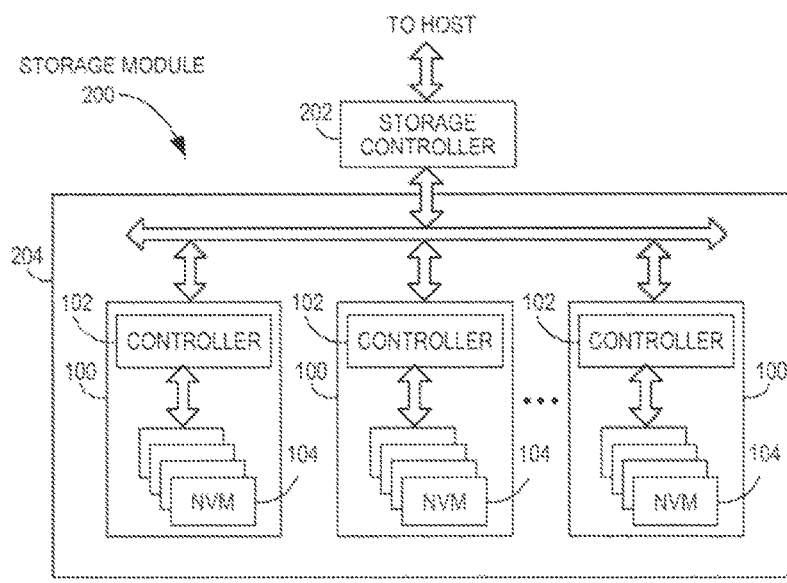
FIG. 1B is a block diagram illustrating a storage module of an embodiment.
Figure 1C:
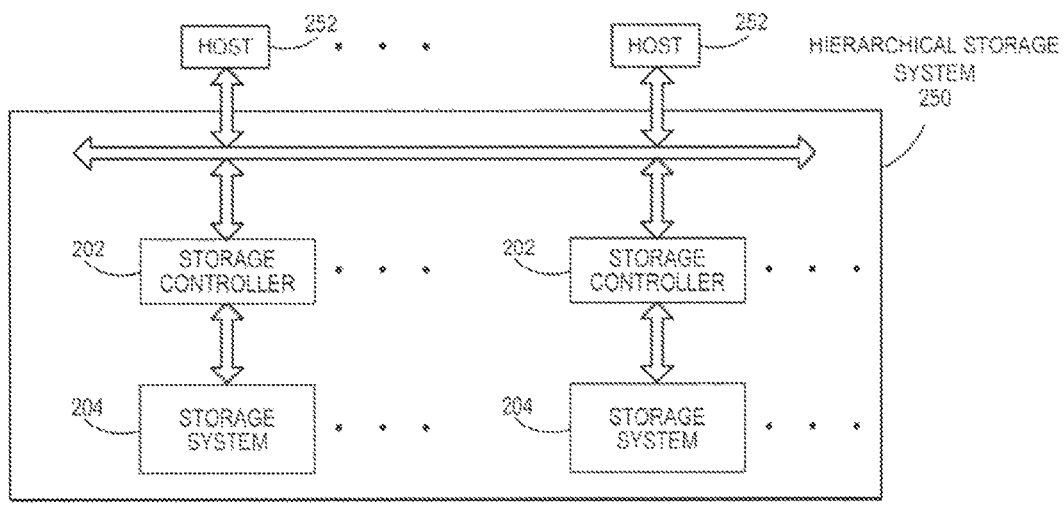
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
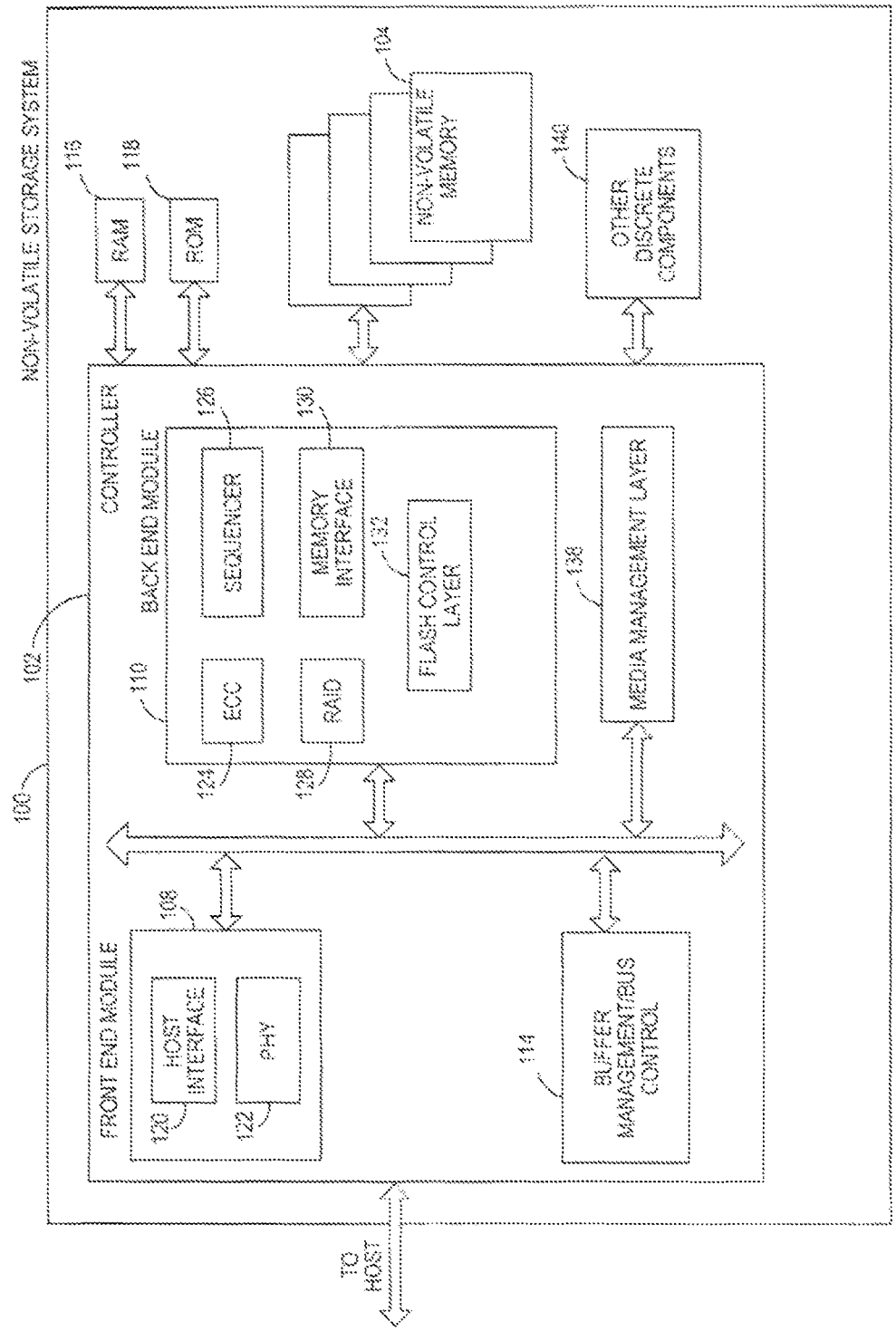
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
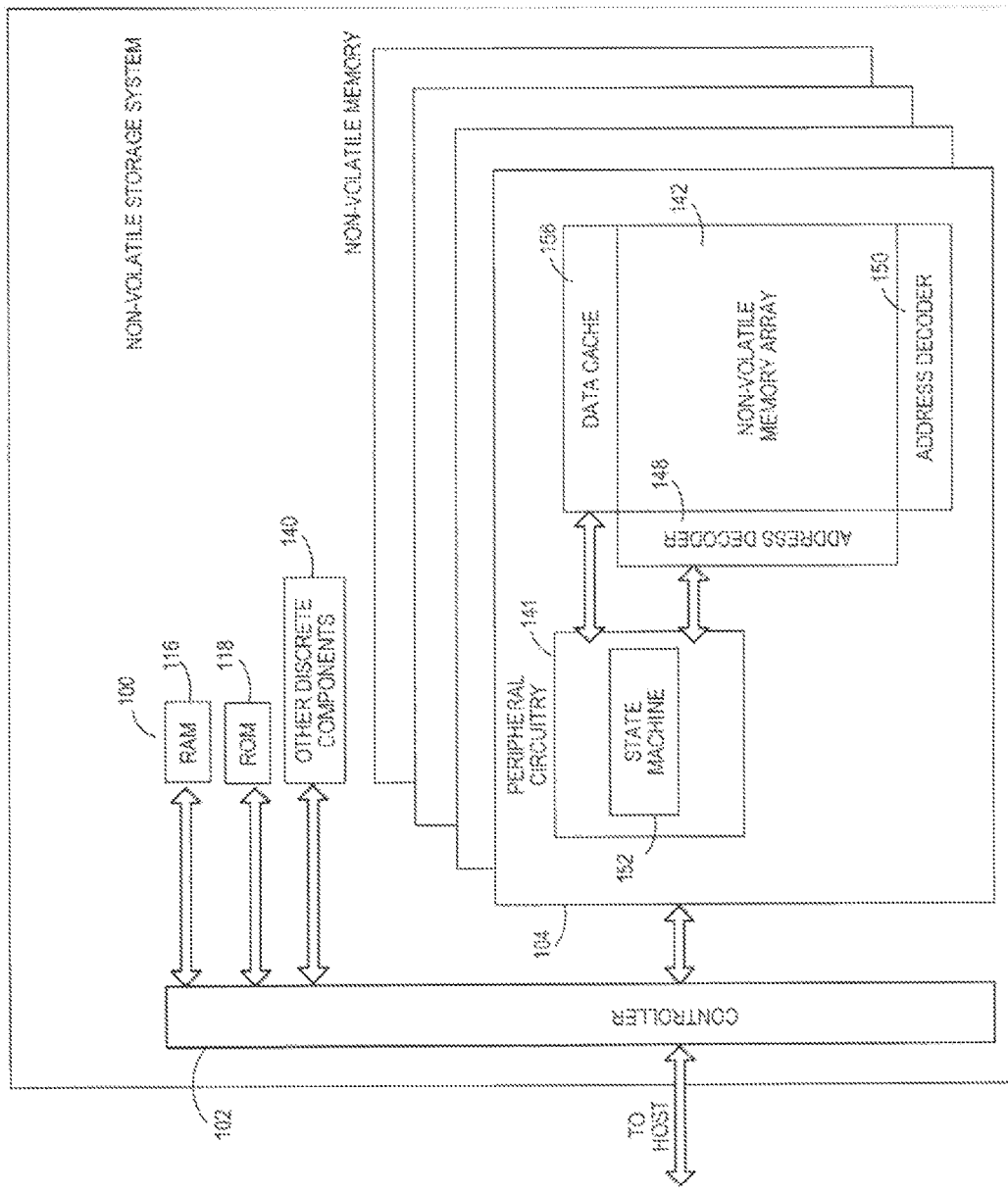
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
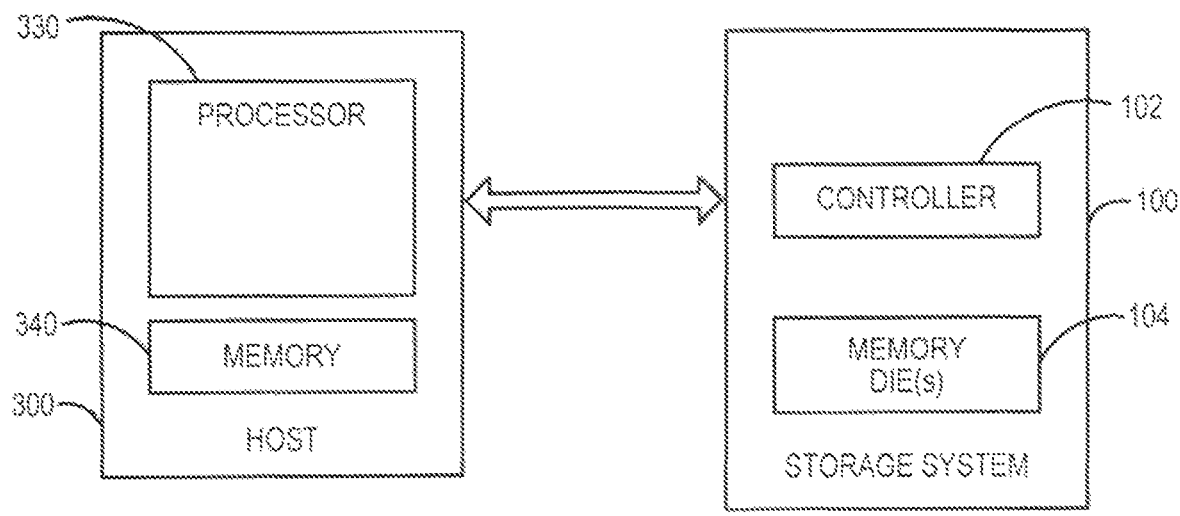
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, fragmentation of the memory of a storage system can decrease performance of the storage system. Keeping storage at a consistent high performance as the host (e.g., phone or laptop) ages (e.g., after more than one year in operation in the field) is a major challenge and pain point for the mobile and consumer industries, which many original equipment manufacturers (OEMs) and storage system vendors try to resolve. One of the main reasons for the degradation in performance observed on storage devices over time relates to file physical fragmentation where different parts of a file are located on different areas in the memory 104 and do not reside sequentially and by the file LBA order. NAND physical fragmentation on the storage media (memory), which is not aligned to the host file system layout within the host logical block address (LBA) range, means that a file or a portion of a file that resides sequentially on the host LBA range may be fragmented on the physical NAND level. This situation may occur very frequently on storage systems due to the basic NAND attribute that NAND memory cannot be randomly accessed. As a result, every "update in place" to a file written by the host file system (i.e., a re-write of an already-written LBA) will need to be written serially on the NAND, which will create invalidations ("holes") in the previously-written NAND blocks. That basic operation of the file system will gradually increase the fragmentation level on the storage physical media while the file will still reside sequentially on the host LBA range. When the host performs a sequential read of a fragmented file or a portion of a fragmented file, the experienced performance may drop significantly due to the increased number of NAND data sense operations required to read the fragmented file.

As this situation may occur very frequently on storage systems due to file system behavior not being aligned with the NAND physical limitations, there may be situations where the storage system ends up with many (e.g., dozens of) fragmented files. A defragmentation ("defrag") process can be used to re-write a file LBA range to the memory so that it is once again arranged according to the file LBA mapping. However, the defragmentation process is a costly process as it creates additional writes and may impact the write amplification factor (WAF), endurance, and latency of the storage system. So, the host or storage system may need to prioritize among fragmented files and choose which files would benefit most by the defragmentation process.

Host file systems have various solutions for fragmentation issues, such as using defragmentation applications or services triggered by the user on the host or by a mobile F2FS file system garbage collection mechanism that is designed to consolidate and defragment the fragmented files. However, these solutions involve rewriting the entire file by the host, which can result in a heavy endurance impact and have wear-out implications. Other solutions may delay the defragmentation process to specific limited times or conditions in order to control or limit the defragmentation penalty on storage endurance. However, that approach can result in a performance drop penalty that the host needs to bear while it is delaying defragmentation.

In another approach, the storage system can be configured to provide an auto-defragmentation solution executed internally by the controller (e.g., in firmware) to gradually improve the physical file fragmentation conditions and prevent degradation of sequential read performance over time. For example, the controller can be configured to monitor the number of data senses it performs per each host read that is greater than a NAND read page size. This method can be performed on every host read of a fragmented NAND page and is based on an automatic defragmentation that is transparent to the host and is executed on a limited number of pages to gradually and carefully improve the sequential read performance.

The following embodiments can be used to allow the storage system 100 or the host 300 to minimize the write-amplification factor (WAF), endurance, and latency impact of the defragmentation operation while adjusting dynamically the tradeoff between lifetime WAF and performance. In one embodiment, a list of logical block address ranges (which may or may not relate to files) that are subjected to defragmentation are created (e.g., by the controller 102). The controller 102 dynamically defines a defragmentation "chunk" size (sometimes referred to herein as a defragmentation unit) and NAND senses threshold (e.g., according to a lifetime WAF versus performance tradeoff per given file/LBA range). The controller 102 then scans a list of logical block address ranges in a defragmentation chunk size resolution and executes a defragmentation/re-write operation for each chunk that it finds to be fragmented.

The following paragraphs provide details of example embodiments. It should be understood that these are merely examples and that other implementations can be used. Accordingly, the details in these examples should not be read into the claims unless expressly recited therein.

Figure 4:
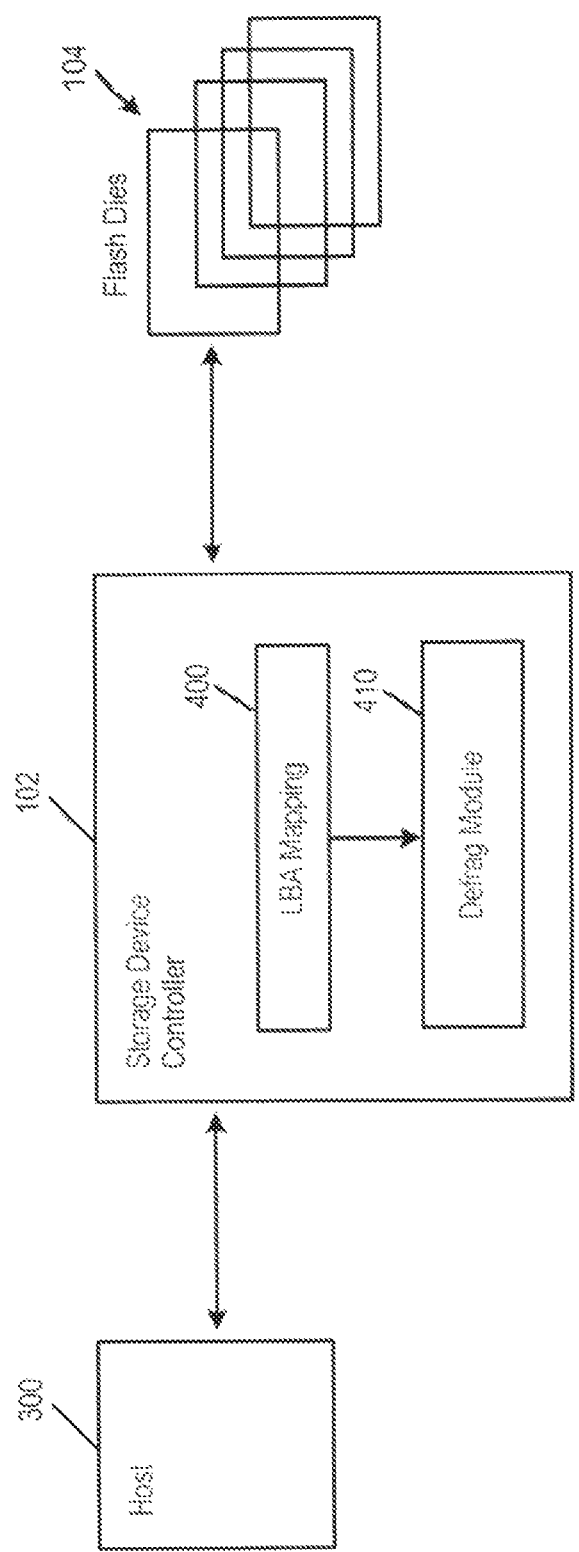
FIG. 4 is a block diagram of a host, controller, and memory dies of an embodiment.

Turning again to the drawings, FIG. 4 is a block diagram of a host 100 and storage system components (controller 102 and memory dies 104) of an embodiment. As shown in FIG. 4, the controller 102 in this embodiment comprises an LBA mapping module 400 and a defragmentation module 410. The LBA mapping module 400 is configured to create a map of LBA ranges, which may or may not relate to particular files. In an alternate embodiment, the map of LBA ranges is created by a host 300 or another entity. The defragmentation module 410 is configured to scan and rewrite fragmented areas, as described below and illustrated in the drawings. Although these two modules are shown as separate modules in FIG. 4, it should be understood that these modules can be combined. Also, one or both modules can be implemented in software/firmware and/or hardware to provide the functions described herein and shown in the drawings.

As noted above, for fragmented LBA ranges (e.g., files), the sequential read performance drop for a given LBA range is correlated to the increase in the number of NAND sense operations required to read that LBA range. However, the fragmentation level is not always expected to be equally spread over the LBA range. In one embodiment, storage fragmentation is handled at the context of a defragmentation "chunk size." A chunk in the size of a die page that has no physical fragmentation is expected to be read with a single NAND sense operation. Any additional NAND sense operations increase this chunk fragmentation level.

FIG. 5 illustrates two examples of fragmented files. In Case #1, a one GB sequential file that was subjected to random writes (e.g., updates in place) is spread all over the one GB file range. As a result of the random write updates, this file now requires 47,562 NAND senses to read the file instead of original 32,768 NAND senses. In Case #2, a one GB file was subjected to random write updates that were focused on a 100 MB area of the file. As a result of the random write updates, this file now requires an additional 47,562 NAND senses to read the file instead of original 32,768 NAND senses.

In both of the cases, an additional 14,794 NAND sense operations will be required to read the one GB file, which is expected to result in a similar performance drop. Using a straightforward defragmentation method, the entire one GB file would be re-written again in order to recover the performance under both of these cases. However, the number of actual fragmented chunks (with more than one NAND sense operation) is different between those cases; specifically, in Case #1, there are many more chunks within the LBA range that require a fix then in Case #2.

In this embodiment, the controller 102 is configured to re-write only chunks in the file LBA range that are found to be fragmented. In some cases, re-writing the LBA in a die page chunk size may be sufficient to recover the full sequential read performance as it will return the number of NAND sense operations to the original one. However, in other implementations, specifically those of multi-die products, die pages that are consecutive on the LBA may be located in different places on the physical media, which may result in some inefficiency in the sequential read pipeline and utilization of the NAND dies. In such cases, re-writing in chunks of die page size would still significantly improve performance, but it will not be able to recover it back to 100% of the original sequential performance capabilities. In such cases, if a full recovery of performance is preferred on the endurance optimization, a larger defragmentation chunk size can be used up to a size of a meta-page, where a meta-page=(Number of dies)*(die page size).

In one embodiment, the controller 102 and/or host 300 is configured to dynamically change the defragmentation chunk size per the desired outcome and product life condition. The controller 102 and/or host 300 can monitor the lifetime/health of the memory 104 and decide on the defragmentation chunk size according to the lifetime status (Beginning of Life versus End of Life). In another implementation, the controller 102 can monitor the amount of data written internally due to defragmentation operations and decide to reduce the defragmentation chunk when a certain payload limit is exceeded.

With references to the two example cases noted above, in using these embodiments, the Case #1 defragmentation operation, which is based on a 32 KB defragmentation chunk size, would result in an internal rewrite of ~460 MB while usage of a defragmentation chunk size of 128 KB would result with practically re-writing the entire one GB file. In contrast, a Case #2 defragmentation operation, which is based on a 32 KB defragmentation chunk size, would result in an internal rewrite of only ~65 MB while usage of defragmentation chunk size of 128 KB would result in a rewrite of only ~100 MB.

One example embodiment starts with a 128 KB defragmentation chunk size at the beginning of life and switches to a 32 KB defragmentation chunk size when the memory lifetime reaches 80% of its lifetime. For this example, a defragmentation method that defragments only the fragmented chunks would be significantly more optimized to WAF, lifetime, and latency than a straightforward defragmentation method that simply re-writes the entire file.

In another embodiment, a dynamic change of the NAND sense threshold configuration is calculated per each chunk size in order to define if the chunk is fragmented. Increasing the NAND sense threshold value when endurance is starting to be limited will limit the defragmentation re-write only to the heavily-fragmented areas within the file range and, by that, allow a better fine-tune between performance and WAF.

One advantages of these embodiments is that re-writes will be done only on actually-fragmented areas, and, hence, there is no concern with triggering the defragmentation process during a comprehensive file system scan, as if files are not fragmented, no additional write will be produced.

By setting the right defragmentation chunk size and NAND sense threshold, these embodiments can define the level of scenarios that will be addressed and can be used to fix files whose physical location is un-aligned to a die page. Such cases may occur because of an initial write pattern (see FIG. 6, for example) and not necessarily because of heavy random write updates. By dynamically updating the thresholds, the controller 102 or host 300 can define that an unaligned file fix will be applied only to certain files or only once in a lifetime at the production line before the end consumer device get to the field.

Figure 6:
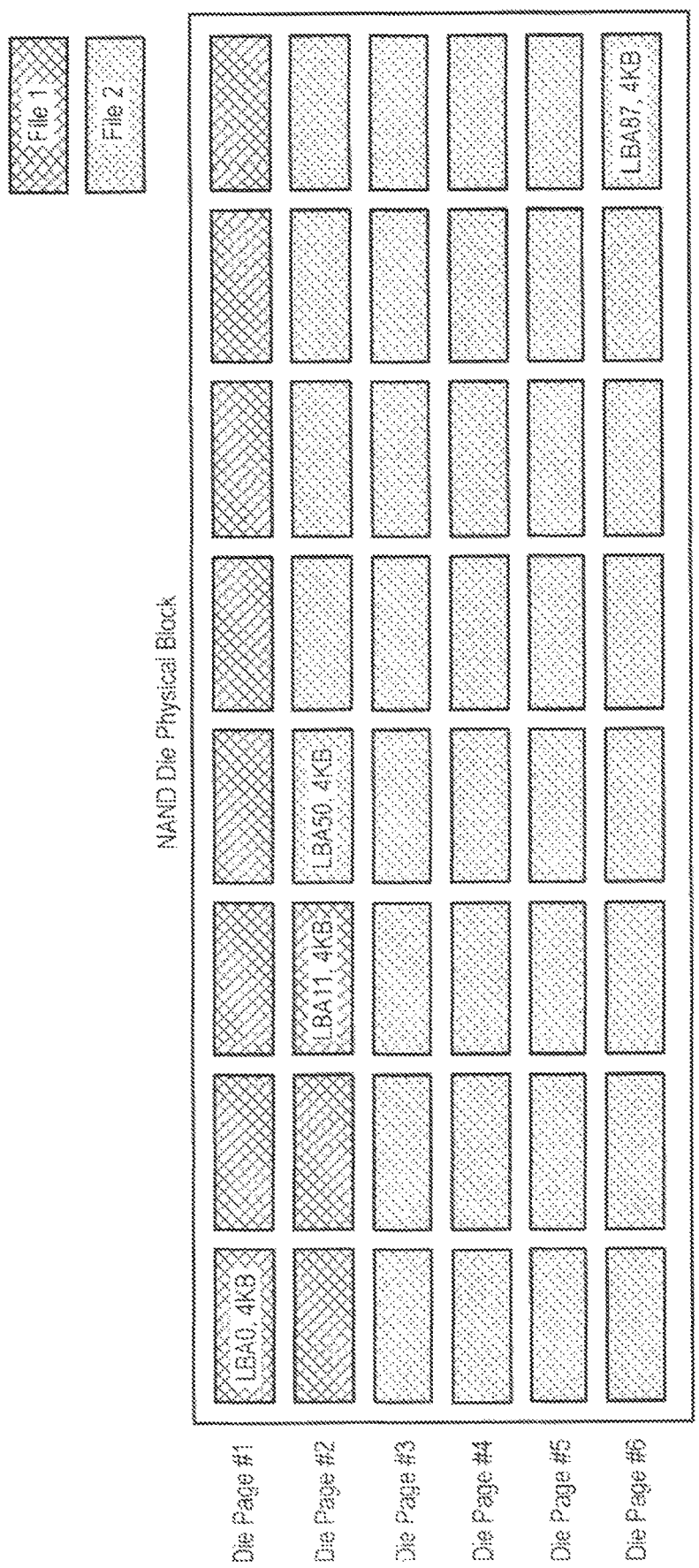
FIG. 6 is an illustration of a memory block of an embodiment.

FIG. 6 illustrates an example of unaligned file conditions resulting from an initial file write pattern and demonstrates the status of a NAND block after (1) a sequential write of File 1 (44 KB total) on LBAs 0-11 and (2) a sequential write of File 2 (148 KB total) on LBAs 50-87. File 2's LBA range is unaligned to the physical die page because of its initial write location in the block. Assuming this file will be read in chunks that are greater than or equal to the die page size, every chunk read will require additional NAND sense operations. Setting the defragmentation chunk size to the expected read chunk size and setting the NAND sense threshold value to two will guarantee that File 2's unaligned location will be fixed by a re-write during the defragmentation process. If, under certain conditions, endurance is preferred on fixing such unaligned file cases, then the NAND sense threshold can be increased.

Figure 7:
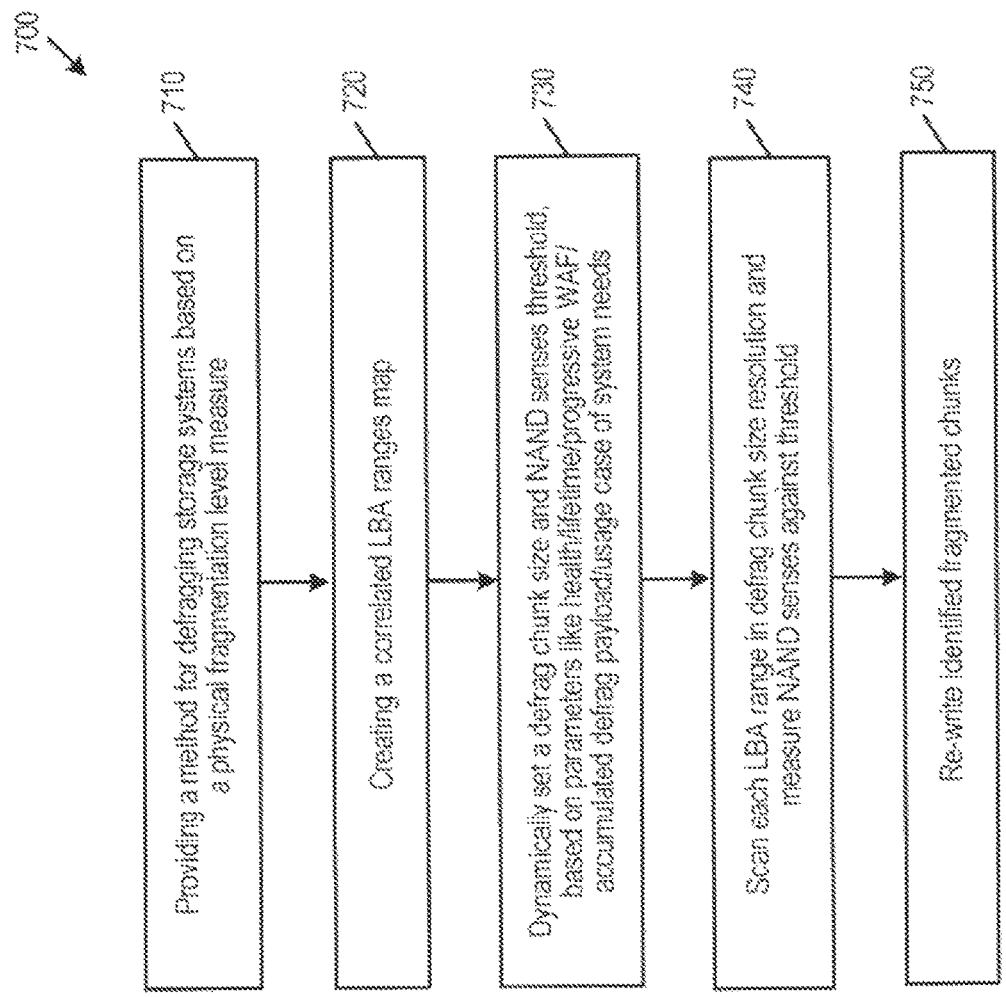
FIG. 7 is a flow chart of a method of an embodiment for optimizing write-amplification factor, endurance, and latency during a defragmentation operation.

Turning again to the drawings, FIG. 7 is a flow chart 700 of a method of an embodiment for optimizing write-amplification factor, endurance, and latency during a defragmentation operation. As shown in FIG. 7, a method is provided for defragging storage systems based on a physical fragmentation level measure (act 710). Here, the controller 102 creates a correlated LBA range map (act 720). As noted above, an LBA range may or may not related to a file, and the LBA range map can be created by the host 300 or another entity instead of by the storage system 100. Then, the controller 102 dynamically sets a defragmentation chunk size and NAND senses threshold based one or more parameters (act 720). These parameters can include, but are not limited to, memory health, lifetime, progressive write-amplification factors, accumulated defragmentation payload, and usage case of storage system needs. Then, the controller 102 scans each LBA range in the defragmentation chuck size resolution and measures the number of NAND senses against a threshold (act 740). The controller 102 then re-writes the identified fragmented chunks (act 750).

There are many alternatives that can be used with these embodiments. For example, one alternative embodiment allows a wider expansion of the defragmentation feature to logically-fragmented files. In this embodiment, the host 300 can provide information to the controller 102 about the order it intends to read the file. One way of doing so would be to send the list of LBAs according to the order that the host 300 intends to read the file (not necessary LBA incremental). The controller 102 can then organize NAND pages according to the order the host-provided order and not mix the page with other data.

Figure 8:
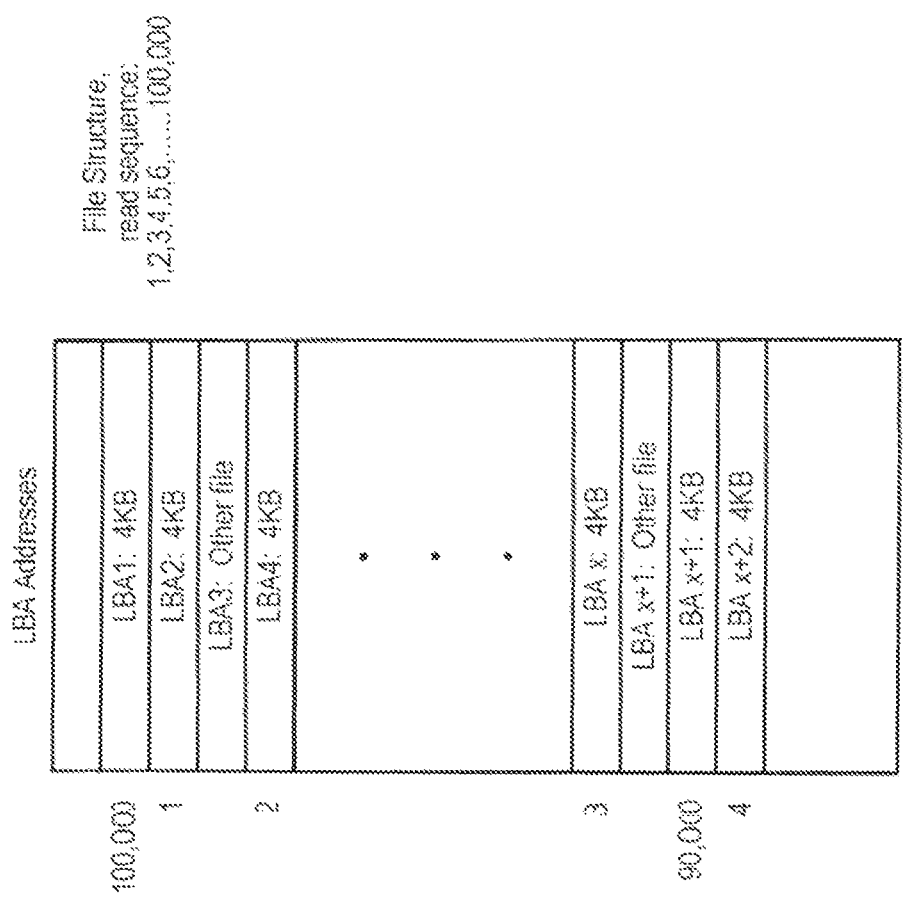
FIG. 8 is an illustration of a logical block address range of an embodiment.

So, in this embodiment, the controller 102 can ask the host 300 to provide it with the LBA list according a read sequence (e.g., 1, 2, 3 . . . 100,000, where these numbers represent read sequence chunks are not LBAs). The controller 102 can then place the data in NAND pages according to that order. The advantage of doing this is that even if the file is fragmented at the logical level, the controller 102 can provide the random read commands from the host 300 with a sequential read performance (as there would be one sense for multiple read commands). So, for example, the controller 102 can place LBA 2, LBA 4, LBA X, and LBA X+2 all in the same NAND page, which would make the feature workable on a wider variety of files (e.g., logically-fragmented files). This is illustrated in FIG. 8. Accordingly, the host 300 can send the controller 102 the order of LBAs it would later read with a command structure that gives the LBA sequence that does not have to be in incremental order (e.g., LBA 2, LBA 4, LBA x, LBA X+1, etc.). Then, the controller 102 can program them on the same physical pages.

In this embodiment, there are three layers: (1) physical address (where the file is in the NAND), (2) logical address (LBA), and (3) file access (read) pattern, where the layers are independent of each other. Defragmentation links between layers 1 and 3 (layer 2 may be is less important for the physical fragmentation that this embodiment is trying to address). This embodiment binds these two layers. The host 300 can provide the file access (read) pattern (e.g. by providing the LBA ranges in the read access pattern and not necessarily in LBA increasing order). The controller 102 can place the data in NAND pages according to that pattern. So, when the controller 102 is reading a NAND page, it can read as much data as possible.

In another alternate embodiment, the host 300 or the controller 102 can identify "temperature" (i.e., indication of how frequently the data is accessed/updated) for each of the user files or LBA ranges and use this intelligence in order to apply different defrag methods per identified temperature and eventually optimize the write amplification factor (WAF) and latency of the overall system using one or more of the below approaches: the controller 102 can decide to prioritize defrag of files with hotter temperature over colder files, the controller 102 can apply different defragmentation chunk sizes or NAND sense thresholds per specific file temperatures, and the controller 102 can rearrange and regroup the data of reported files by the same temperature type, moving all files of same temperature to separate blocks, respectively. In the later approach described here, the storage system 100 can keep all cold files data separately from hot and warm data. Thus, cold files will not be mixed with frequently-updated data pages and will not be frequently relocated as part of the storage system's internal garbage collection.

The storage system 100 can implement its garbage collection or defrag method more efficiently to relocate and move data pages based on its temperature. This can result in a reduction in garbage collection write amplification and performance improvement. More specifically, user files and data with different access frequency (temperature—hot/cold/warm) may be interleaved on the physical storage level and located on the same physical blocks. This situation may result in insufficient garbage collection because data for hot, cold, and warm files are mixed with each other, which can result in a significant performance drop while the user is trying to access those files.

Applying the temperature indication into the controller methods during the defragmentation operation can provide a more-accurate method for the internal data placement and result in more-efficient garbage collection that is based on a real file usage frequency Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
   a memory; and
   a controller coupled to the memory and configured to:
      dynamically determine a size of a defragmentation unit based on an endurance of the memory;

dynamically determine a memory sense threshold based on the endurance of the memory;
analyze a logical block address range of data stored in the memory, wherein the logical block address range is analyzed in a resolution of the defragmentation unit; and
for each defragmentation unit:
determine a fragmentation level of the defragmentation unit by measuring a number of memory senses needed to read the defragmentation unit using the dynamically determined memory sense threshold;
determine if the fragmentation level is above a fragmentation threshold; and
in response to determining that the fragmentation level is above the defragmentation threshold, perform a defragmentation operation on the defragmentation unit.

2. The storage system of claim 1, wherein a size of the defragmentation unit decreases with an age of the storage system.

3. The storage system of claim 1, wherein the defragmentation unit with no fragmentation is readable by a single memory sense.

4. The storage system of claim 1, wherein the controller is further configured to dynamically define the threshold based on endurance and performance tradeoffs.

5. The storage system of claim 1, wherein the controller is further configured to perform the defragmentation operation independent of receiving a read command from a host.

6. The storage system of claim 1, wherein the controller is further configured to perform the defragmentation operation without receiving an instruction from a host to perform the defragmentation operation.

7. The storage system of claim 1, wherein the data comprises a file.

8. The storage system of claim 1, wherein the controller is further configured to identify the logical block address range.

9. The storage system of claim 1, wherein the logical block address range is identified by a host.

10. The storage system of claim 1, wherein the memory comprises a three-dimensional memory.

11. A method performed in a storage system comprising a memory, the method comprising:
dynamically determining a size of a defragmentation unit based on an endurance of the memory;
dynamically determining a memory sense threshold based on the endurance of the memory;
analyzing a logical block address range of data stored in the memory, wherein the logical block address range is analyzed in a resolution of the defragmentation unit; and
for each defragmentation unit:
determining a fragmentation level of the defragmentation unit by measuring a number of memory senses needed to read the defragmentation unit using the dynamically determined memory sense threshold;
determining if the fragmentation level is above a fragmentation threshold; and
in response to determining that the fragmentation level is above the defragmentation threshold, performing a defragmentation operation on the defragmentation unit.

12. The method of claim 11, wherein the defragmentation unit with no fragmentation is readable by a single memory sense.

13. The method of claim 11, wherein the data comprises a file.

14. A storage system comprising:
a memory;
means for dynamically determining a size of a defragmentation unit based on an endurance of the memory;
means for dynamically determining a memory sense threshold based on the endurance of the memory;
means for analyzing a logical block address range of data stored in the memory, wherein the logical block address range is analyzed in a resolution of the defragmentation unit; and
means for, for each defragmentation unit:
determining a fragmentation level of the defragmentation unit by measuring a number of memory senses needed to read the defragmentation unit using the dynamically determined memory sense threshold;
determining if the fragmentation level is above a fragmentation threshold; and
in response to determining that the fragmentation level is above the defragmentation threshold, performing a defragmentation operation on the defragmentation unit.

* * * * *